(12) United States Patent
Takeuchi (10) Patent No.: US 11,624,327 B2
(45) Date of Patent: Apr. 11, 2023

(54) ENGINE

(71) Applicant: KABUSHIKI KAISHA TOYOTA JIDOSHOKKI, Kariya (JP)

(72) Inventor: Yoshitaka Takeuchi, Aichi-ken (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 0 days.

(21) Appl. No.: 17/441,141

(22) PCT Filed: Feb. 21, 2020

(86) PCT No.: PCT/JP2020/007056
§ 371 (c)(1),
(2) Date: Sep. 20, 2021

(87) PCT Pub. No.: WO2020/195427
PCT Pub. Date: Oct. 1, 2020

(65) Prior Publication Data
US 2022/0163002 A1    May 26, 2022

(30) Foreign Application Priority Data
Mar. 25, 2019 (JP) .............................. JP2019-056394

(51) Int. Cl.
*F02D 33/00* (2006.01)
*F02M 33/00* (2006.01)

(52) U.S. Cl.
CPC ........... *F02D 33/006* (2013.01); *F02M 33/00* (2013.01)

(58) Field of Classification Search
CPC .............................. F02D 33/006; F02D 33/00
See application file for complete search history.

(56) References Cited

U.S. PATENT DOCUMENTS 8,370,049 B1 * 2/2013 Shimizu .............. F02D 19/0671
123/304
2011/0283959 A1   11/2011 Aso et al.

FOREIGN PATENT DOCUMENTS

| JP | 2003-097306 A | | 4/2003 |
| JP | 2008-063996 A | | 3/2008 |
| JP | 2008063996 A | * | 3/2008 |
| WO | 2011/145434 A1 | | 11/2011 |

* cited by examiner

*Primary Examiner* — Kevin A Lathers
(74) *Attorney, Agent, or Firm* — Sughrue Mion, PLLC (57) ABSTRACT

An engine includes a reformer, a reforming-air adjuster, a reforming-fuel supply unit, a reformed-gas adjuster, and a control unit. The reformer is configured to reform fuel into a reformed gas. When a start signal is input, the control unit controls the reforming-air adjuster and the reforming-fuel supply unit to a reformable state in which the fuel is reformable in the reformer, and the control unit controls the reformed-gas adjuster so that the reformed gas flows through the reformed-gas adjuster with a degree of opening smaller than a normal degree of opening that is a degree of opening of the reformed-gas adjuster when composition of the reformed gas is in a stable state before the composition of the reformed gas becomes in the stable state, for a given period of time including at least a period immediately after the engine starts.

6 Claims, 6 Drawing Sheets

(a)
Degree of opening
of stop valve

(b)
Ratio b/w 1st ammonia
gas and reformed gas
in air-fuel mixture

Degree of opening of stop valve

(b)

Ratio b/w 1st ammonia gas and reformed gas in air-fuel mixture (c)

Time accumulation value of flow rate of reforming air

ENGINE

CROSS REFERENCE TO RELATED APPLICATIONS

This application is a National Stage of International Application No. PCT/JP2020/007056 filed Feb. 21, 2020, claiming priority based on Japanese Patent Application No. 2019-056394 filed Mar. 25, 2019, the contents of all of which are incorporated herein by reference in their entirety.

TECHNICAL FIELD

The present invention relates to an engine including a reformer that is configured to reform fuel into a reformed gas.

BACKGROUND ART

As an example of a conventional engine including the reformer that is configured to reform the fuel into the reformed gas, an engine including a main fuel-supply unit configured to inject the fuel into an intake flow passage and a reformed-gas adjuster configured to adjust a flow rate of the reformed gas reformed from the fuel by the reformer is known (for example, Patent Literature 1).

CITATION LIST

Patent Literature

Patent Literature 1: Japanese Patent Application Publication No. 2008-63996

SUMMARY OF INVENTION

Technical Problem

In the above-described conventional engine, for example, the fuel injected from the main fuel-supply unit and the reformed gas the flow rate of which is adjusted by the reformed-gas adjuster are combusted in a combustion chamber of the engine. However, for example, immediately after the engine starts, and if, for example, the reformer may not be sufficiently heated yet, composition of the reformed gas introduced into the intake flow passage may be unstable, and thus, a gas mixture of the fuel and the reformed gas in the combustion chamber of the engine is unlikely to have an adequate air-fuel ratio. This may cause performance of the engine to deteriorate. For example, engine speed may become unstable, or performance of the exhaust gas of the engine may deteriorate.

It is an objective of the present invention to provide an engine capable of reducing deterioration in performance caused by composition of a reformed gas that is introduced into an intake flow passage immediately after the engine starts.

Solution to Problem

An engine according to an aspect of the present invention is an engine including a reformer that is configured to reform fuel into a reformed gas. The engine includes an intake flow passage configured to flow intake air to the engine, a reforming flow passage provided with the reformer and configured to flow reforming air to the reformer and to flow the reformed gas from the reformer to the intake flow passage, a main fuel-supply unit disposed in the intake flow passage and configured to supply the fuel to the intake flow passage, a reforming-air adjuster disposed in the reforming flow passage and configured to adjust a flow rate of the reforming air, a reforming-fuel supply unit disposed in the reforming flow passage and upstream from the reformer and configured to supply the fuel to the reforming flow passage, a reformed-gas adjuster disposed in the reforming flow passage and configured to adjust a flow rate of the reformed gas, a start-signal output unit configured to output a start signal to start the engine, and a control unit configured to control the main fuel-supply unit, the reforming-air adjuster, the reforming-fuel supply unit, and the reformed-gas adjuster, based on the start signal and an engine status of the engine. When the start signal is input, the control unit controls the reforming-air adjuster and the reforming-fuel supply unit to a reformable state in which the fuel is reformable in the reformer, and the control unit controls the reformed-gas adjuster to a degree of opening smaller than a normal degree of opening that is a degree of opening of the reformed-gas adjuster when composition of the reformed gas is in a stable state, for a given period of time including at least a period immediately after the engine starts.

In the engine according to the aspect of the present invention, the reformed-gas adjuster is controlled to the reformable state in which the fuel is reformable in the reformer when the start signal is input, and is controlled to a degree of opening smaller than the normal degree of opening for the given period of time including at least the period immediately after the engine starts. This reduces the flow rate of the reformed gas introduced into the intake flow passage of the engine to less than the flow rate of the reformed gas flowing at the normal degree of opening at least immediately after the engine starts. Therefore, for example, even when the composition of the reformed gas is not in the stable state immediately after the engine starts, an adverse effect of unstable composition of the reformed gas on performance of the engine is reduced. As a result, the engine is capable of reducing deterioration in performance caused by the composition of the reformed gas that is introduced into the intake flow passage immediately after the engine starts.

In the engine according to another aspect of the present invention, the control unit may control the reformed-gas adjuster so that the degree of opening of the reformed-gas adjuster gradually increases from an initial degree of opening smaller than the normal degree of opening to the normal degree of opening after the start signal is input. In this case, the flow rate of the reformed gas introduced into the intake flow passage of the engine gradually increases, which gradually changes an air-fuel ratio of an air-fuel mixture in a combustion chamber of the engine.

In the engine according to another aspect of the present invention, the given period of time may include a period in which a predetermined time elapses since the start signal is input. In this case, the reformed-gas adjuster is controlled based on an inference that the composition of the reformed gas would be stable according to the elapsed time since the start signal is input.

The engine according to another aspect of the present invention may further include an air-flow rate obtaining unit disposed in the reforming flow passage and configured to obtain the flow rate of the reforming air. The given period of time may include a period from a point of time in which the start signal is input to a point of time in which a time accumulation value of the flow rate of the reforming air obtained by the air-flow rate obtaining unit reaches a predetermined reformed-gas replacement volume. In this case, the reformed-gas adjuster is controlled based on an inference that the composition of the reformed gas would be stable according to the time accumulation value of the flow rate of the reforming air since the start signal is input.

In the engine according to another aspect of the present invention, the initial degree of opening may be a fully-closed degree of opening of the reformed-gas adjuster, and the normal degree of opening may be a fully-opened degree of opening of the reformed-gas adjuster. In this case, the adverse effect of the composition of the reformed gas introduced into the intake flow passage on the performance of the engine is more securely reduced.

The engine according to another aspect of the present invention may be an ammonia engine including the reformer that is configured to reform ammonia as the fuel into the reformed gas containing a hydrogen gas. In the above engine, the deterioration in the performance caused by the unstable composition of the reformed gas is more likely to occur than in an engine including the reformer that is configured to reform fuel containing, for example, hydrocarbons into the reformed gas. Therefore, an effect of reduction in the deterioration in the performance is enhanced by the above-described configuration of the engine according to the aspect.

Advantageous Effects of Invention

The engine according to the present invention is capable of reducing the deterioration in the performance caused by the composition of the reformed gas that is introduced into the intake flow passage immediately after the engine starts.

DESCRIPTION OF EMBODIMENTS

An embodiment of the present invention will now be described in detail with reference to the accompanying drawings. Components identical with or equivalent to those previously illustrated in the drawings will be provided with identical reference numerals, duplicated descriptions of which will be omitted.

Figure 1:
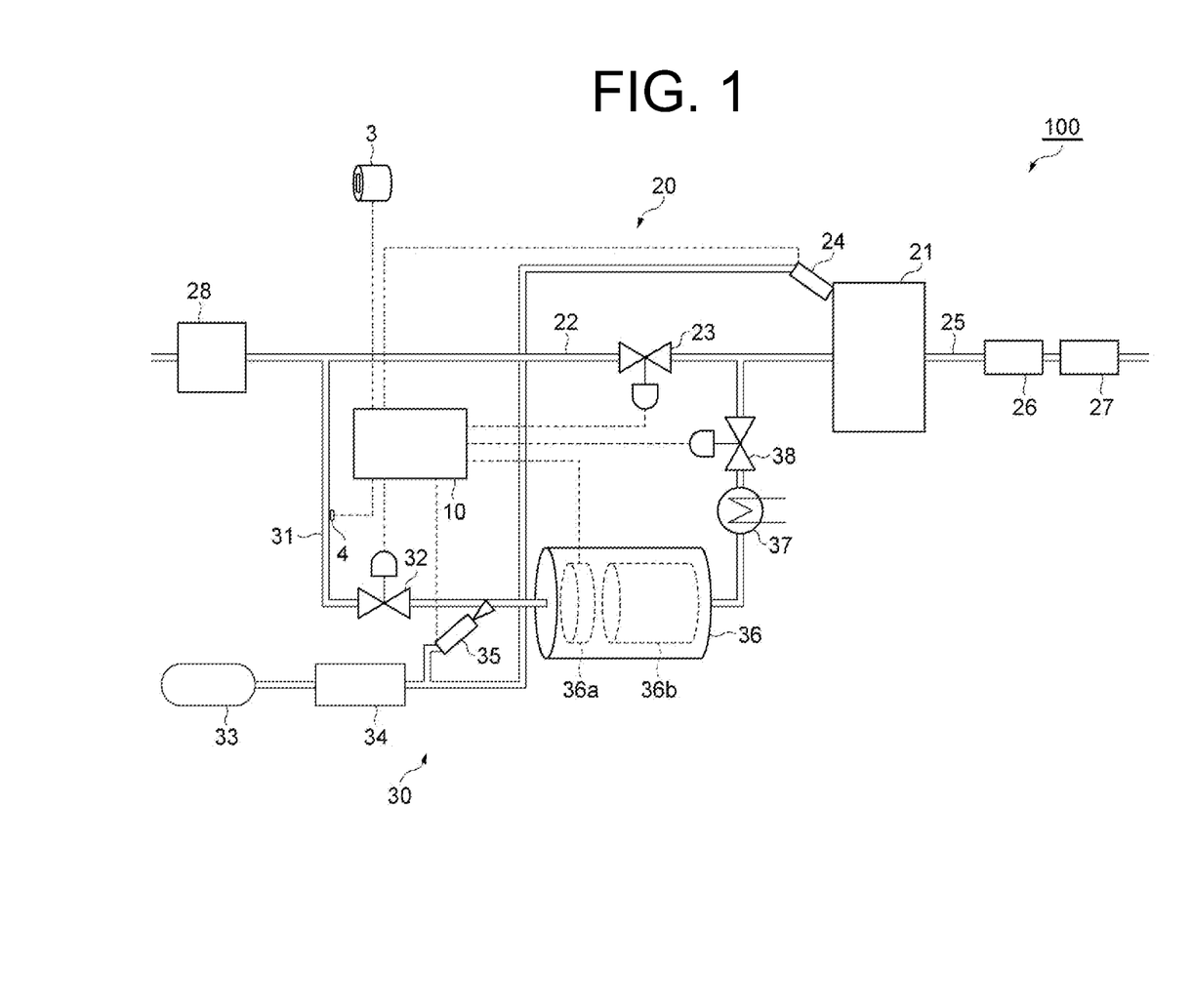
FIG. 1 is a schematic configuration of an engine according to an embodiment of the present invention.

FIG. 1 is a schematic configuration of an engine according to an embodiment of the present invention. As illustrated in FIG. 1, an engine 100 according to the present embodiment includes an electronic control unit (ECU) 10, an engine main portion 20, and a reforming assembly 30. The engine 100 is an internal-combustion engine configured to combust an air-fuel mixture containing ammonia ($NH_3$), such as a four-stroke reciprocating engine. The engine 100 is mounted on an industrial vehicle such as a forklift for a cargo handling operation. The engine 100 may be mounted on other vehicles such as a passenger car, a truck, a bus, or the like.

The engine main portion 20 includes an engine main body 21, an intake flow passage 22, a main throttle 23, a main injector (main fuel-supply unit) 24, an exhaust flow passage 25, a three-way catalyst 26, and a selective catalytic reduction (SCR) 27 as an example of an ammonia adsorption catalyst.

The engine main body 21 is a main portion of the engine 100 and is configured to combust the air-fuel mixture. The engine main body 21 includes a cylinder block, a cylinder head, a piston, and the like. In the engine main body 21, a combustion chamber is defined by the cylinder block, the cylinder head, and the piston. The cylinder head may be provided with, for example, an ignition plug. The engine main body 21 includes a starter configured to start the engine 100.

The intake flow passage 22 is a flow passage through which the intake air flows into the engine main body 21 of the engine 100. The intake flow passage 22 includes, for example, a pipe, a surge tank, an intake manifold, an air-intake port, and the like. Near an air inlet of the intake flow passage 22, an air cleaner 28 configured to filter the intake air is provided, for example.

The main throttle 23 is a valve configured to adjust a flow rate of the air taken through the air cleaner 28. The main throttle 23 is disposed in the intake flow passage 22 and downstream from the air cleaner 28. The main throttle 23 is, for example, an electronically controlled throttle valve. The main throttle 23 is electrically connected to the ECU 10. An operation of the main throttle 23 is controlled by the ECU 10.

The main injector 24 is a valve configured to inject fuel to the intake flow passage 22. The main injector 24 is disposed in the intake flow passage 22 and downstream from the main throttle 23. The number of the main injectors 24 may be either single or multiple. When the number of the main injectors 24 is single, the main injector 24 may be provided to, for example, the air-intake port of the engine main body 21. When the number of the main injectors 24 is multiple, the main injectors 24 may be provided to, for example, the surge tank of the engine main body 21. The main injector 24 may be disposed in the intake flow passage 22 and upstream from the main throttle 23. Alternatively, instead of the main injector 24, a fuel-supply device such as a mixer may be disposed in the intake flow passage 22 so as to supply the fuel.

The main injector 24 according to the embodiment injects an ammonia gas that does not include a reformed gas as the fuel. The main injector 24 is electrically connected to the ECU 10. An operation of the main injector 24 is controlled by the ECU 10. The main injector 24 is controlled by the ECU 10 so as to adjust an amount of the ammonia gas to be supplied to the intake flow passage 22. The main injector 24 is controlled so as to inject the ammonia gas when, for example, the reformed gas from a reformer 36 is not sufficient by itself to produce required energy (to be described later).

The exhaust flow passage 25 is a passage through which an exhaust gas flows from the engine main body 21 of the engine 100. The exhaust flow passage 25 includes, for example, an exhaust port, a pipe, an aftertreatment device, a silencer, and the like. The three-way catalyst 26, and the SCR 27 as an example of the ammonia adsorption catalyst are provided to the exhaust flow passage 25 in this order. The three-way catalyst 26 is a catalyst that oxidizes $H_2$ in the exhaust gas and reduces NO$_x$ in the exhaust gas, so as to clean the exhaust gas. The SCR 27 is the selective reduction catalyst that reduces NO$_x$ contained in the exhaust gas to clean the exhaust gas. Instead of the SCR 27, a catalyst made of an alternative material (such as a zeolite-base material) that adsorbs the ammonia may be used.

The reforming assembly 30 includes a reforming flow passage 31, a reforming-air throttle (reforming-air adjuster) 32, an NH$_3$ tank 33, a vaporizer 34, a reforming-fuel injector (reforming-fuel supply unit) 35, the reformer 36, a cooler 37, and a stop valve (reformed-gas adjuster) 38.

The reforming flow passage 31 is a flow passage through which the fuel is reformed into the reformed gas. The reforming flow passage 31 is provided to connect, for example, the upstream side and the downstream side of the intake flow passage 22 with respect to the main throttle 23. The reforming flow passage 31 is configured to flow the reforming air from the upstream side of the intake flow passage 22 with respect to the main throttle 23 to the reformer 36, and to flow the reformed gas from the reformer 36 to the downstream side of the intake flow passage 22 with respect to the main throttle 23. The reforming air is air used for reforming the fuel into the reformed gas by the reformer 36. The reformer 36 is disposed in the reforming flow passage 31. The reforming flow passage 31 may be configured to flow the air taken from outside through a specialized air cleaner to the reformer 36 as the reforming air, without being connected to the upstream side of the intake flow passage 22 with respect to the main throttle 23.

The reforming-air throttle 32 is a valve configured to adjust a flow rate of the reforming air. The reforming-air throttle 32 is disposed in the reforming flow passage 31 and upstream from the reformer 36. The reforming-air throttle 32 is, for example, an electronically controlled throttle valve. The reforming-air throttle 32 is electrically connected to the ECU 10. An operation of the reforming-air throttle 32 is controlled by the ECU 10.

The NH$_3$ tank 33 is a tank for storing the ammonia as the fuel. A type of the NH$_3$ tank 33 is not particularly restricted. For example, a general steel tank may be used as the NH$_3$ tank 33. In the NH$_3$ tank 33, for example, the ammonia is pressurized so as to maintain a liquid state. The NH$_3$ tank 33 is connected to the vaporizer 34.

The vaporizer 34 vaporizes the ammonia introduced from the NH$_3$ tank 33. The vaporizer 34 is connected to the main injector 24 and the reforming-fuel injector 35. The vaporized ammonia (ammonia gas) is introduced to the main injector 24 and the reforming-fuel injector 35. A regulator configured to regulate a pressure of the ammonia gas may be provided between the vaporizer 34 and, the main injector 24 and the reforming-fuel injector 35.

The reforming-fuel injector 35 is a valve configured to adjust the amount of the ammonia gas to be supplied to the reformer 36. The reforming-fuel injector 35 is disposed in the reforming flow passage 31 and upstream from the reformer 36. The reforming-fuel injector 35 is disposed at a position between the reforming-air throttle 32 and the reformer 36 in the reforming flow passage 31. The reforming-fuel injector 35 injects the fuel to the reforming flow passage 31. The number of the reforming-fuel injectors 35 may be, for example, single. The reforming-fuel injector 35 is electrically connected to the ECU 10. An operation of the reforming-fuel injector 35 is controlled by the ECU 10. Instead of the injector, an ejector may be used as the reforming-fuel supply unit.

The reformer 36 reforms the fuel to generate the reformed gas. The reformer 36 according to the embodiment reforms the ammonia as the fuel into the reformed gas containing a hydrogen gas (H$_2$). The reformer 36 includes a reformer heater 36a and a reforming catalyst 36b that reforms the fuel. The reformer heater 36a is disposed upstream from the reforming catalyst 36b and used for heating the reforming catalyst 36b. The reformer heater 36a is, for example, an electric heater. The reformer heater 36a is electrically connected to the ECU 10. An operation of the reformer heater 36a is controlled by the ECU 10. Alternatively, the reformer heater 36a may be a small combustor.

The reforming catalyst 36b reforms the ammonia gas injected from the reforming-fuel injector 35 by using the reforming air. The reforming catalyst 36b according the embodiment is an autothermal reforming (ATR) ammonia reforming catalyst. The reforming catalyst 36b dissociates the ammonia gas by using the reforming air with help of heat generated by the reformer heater 36a or heat of a reaction of the reforming catalyst 36b, so as to generate the reformed gas that contains the hydrogen gas and the ammonia gas. The reforming catalyst 36b is generally used in a reducing atmosphere (that is, an NH$_3$-rich atmosphere). A low-temperature reactive catalyst may be used as the reforming catalyst 36b.

The cooler 37 is disposed in the reforming flow passage 31 and downstream from the reformer 36. The cooler 37 cools the reformed gas flowing from the reformer 36. Example of the cooler 37 may include a heat exchanger that uses a coolant of the engine 100 or a wind generated by the vehicle running as a low-temperature heat source.

The stop valve 38 is disposed in the reforming flow passage 31 and downstream from the reformer 36. The stop valve 38 according to the embodiment is, for example, a solenoid valve disposed between the cooler 37 and the intake flow passage 22. The stop valve 38 is configured to adjust a flow rate of the reformed gas flowing from the reforming flow passage 31 into the intake flow passage 22. The stop valve 38 is electrically connected to the ECU 10. An operation of the stop valve 38 is controlled by the ECU 10.

The stop valve 38 is controlled by the ECU 10 so that a degree of opening continually or gradually changes between a fully-closed degree of opening and a fully-opened degree of opening. The fully-closed degree of opening of the stop valve 38 refers to a degree of opening that does not allow the gas to flow through the stop valve 38. The fully-closed degree of opening may be the smallest degree of opening of the stop valve 38, or a minimal degree of opening of the stop valve 38, within a range in which the gas is not substantially allowed to flow through the stop valve 38. The fully-opened degree of opening of the stop valve 38 refers to the greatest degree of opening of the stop valve 38.

In the engine 100 configured as described above, the air-fuel mixture containing the ammonia gas and the hydrogen gas is taken from the intake flow passage 22 into the combustion chamber by the piston moving to the bottom dead center during an intake stroke. In the intake flow passage 22, the air-fuel mixture is generated by mixing the ammonia gas injected from the main injector 24 and the reformed gas reformed in the reformer 36, with the air flowing through the main throttle 23. The air-fuel mixture taken into the combustion chamber is compressed by the piston moving up to the top dead center during a compression stroke. The compressed air-fuel mixture is combusted by the ignition plug igniting. The combustion gas pushes down the piston to the bottom dead center during a combustion stroke, and then is discharged into the exhaust flow passage 25 as an exhaust gas by the piston moving up to the top dead center during an exhaust stroke.

The air-fuel mixture according to the embodiment is a mixture of the air taken by the engine main body 21 through the intake flow passage 22 with the fuel. The ammonia in the air-fuel mixture contains an ammonia gas derived from an ammonia gas injected from the main injector 24 (hereinafter referred to as a "first ammonia gas"), and an ammonia gas derived from the reformed gas flowing from the reformer 36 (hereinafter referred to as a "second ammonia gas"). When the ammonia gas is not injected from the main injector 24, the only ammonia gas contained in the air-fuel mixture is the second ammonia gas. The hydrogen gas contained in the air-fuel mixture is the hydrogen gas derived from the reformed gas.

Figure 2:
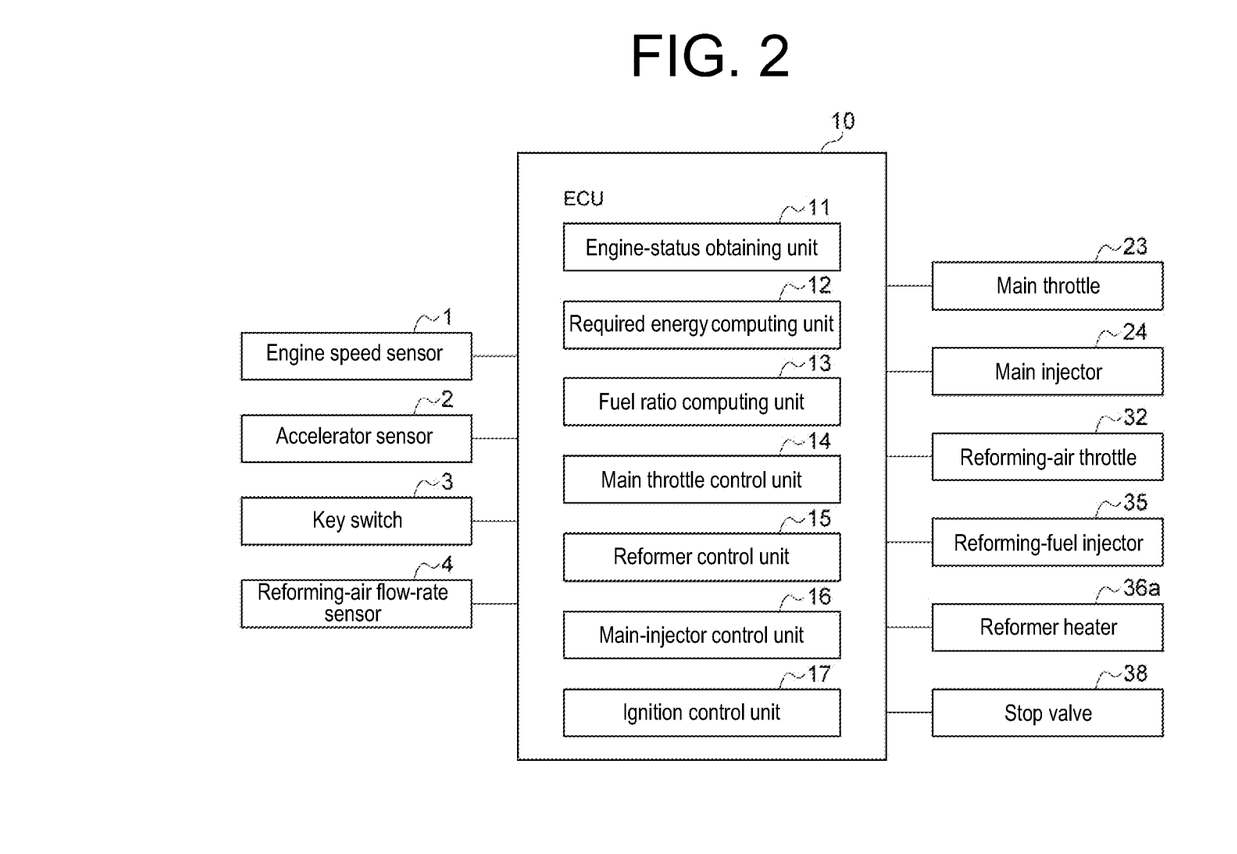
FIG. 2 is a block diagram illustrating a configuration of control of the engine illustrated in FIG. 1.

FIG. 2 is a block diagram illustrating a configuration of control of the engine illustrated in FIG. 1. As illustrated in FIG. 2, the ECU 10 is electrically connected to an engine speed sensor 1, an accelerator sensor 2, a key switch (start-signal output unit) 3, and a reforming-air flow-rate sensor (air-flow rate obtaining unit) 4.

The ECU 10 is an electronically controlled unit configured to control the engine 100. The ECU 10 is a controller including a central processing unit (CPU), a read only memory (ROM), a random access memory (RAM), a communication circuit, and the like. The ECU 10 implements various functions. For example, a program stored in the ROM is loaded into the RAM, and the loaded program in the RAM is implemented by the CPU. The ECU 10 may include a plurality of electronic units.

The engine speed sensor 1 is a detector configured to detect, for example, the number of crank-shaft revolutions (engine speed) of the engine 100. The engine speed sensor 1 outputs a detection signal indicative of the detected engine speed to the ECU 10. The accelerator sensor 2 is a detector configured to detect, for example, an amount of depressing the accelerator pedal. The accelerator sensor 2 outputs a detection signal indicative of the detected amount of depressing the accelerator pedal to the ECU 10.

The key switch 3 is a switch configured to output a start signal to start the engine 100. The key switch 3 is, for example, an ignition switch that is operated to activate a starter of the engine main body 21. The key switch 3 is operated by inserting and turning a key. The key switch 3 includes a key cylinder having a physical contact point inside. The key cylinder includes multiple switch states that are switchable according to respective operation positions of the key switch 3. The switch states include an OFF state, an ON state (to turn on the key switch), and a ST state (to turn on a starter switch). The key switch 3 outputs a signal indicative of the switch state to the ECU 10. Instead of the key switch 3, a button to output the start signal to start the engine 100 may be used.

The key switch 3 outputs, when the switch state is set at the OFF state, an OFF signal to the ECU 10 by switching a vehicle operation circuit in the vehicle to an opened state, for example. The key switch 3 outputs, when the switch state is set at the ON state, an ON signal to the ECU 10 by switching the vehicle operation circuit in the vehicle to a closed state, for example. The key switch 3 outputs, when the switch state is set at the ST state, an ST signal (the start signal) to the ECU 10 by switching an engine start circuit in the vehicle to a closed state, for example. An electronic circuit may be used for the key switch 3 so as to output the above-described signals according to respective operations of a vehicle driver.

The reforming-air flow-rate sensor 4 is a detector configured to detect the flow rate of the reforming air that flows through the reforming-air throttle 32. The reforming-air flow-rate sensor 4 sends a detection signal indicative of the detected flow rate of the reforming air to the ECU 10.

The following will describe a functional configuration of the ECU 10. The ECU 10 includes an engine-status obtaining unit 11, a required energy computing unit 12, a fuel ratio computing unit 13, a main throttle control unit 14, a reformer control unit 15, a main-injector control unit 16, and an ignition control unit 17.

The engine-status obtaining unit 11 obtains an engine status. The engine-status obtaining unit 11 obtains, for example, the engine speed detected by the engine speed sensor 1 and the amount of depressing the accelerator pedal detected by the accelerator sensor 2 as the engine status. The engine-status obtaining unit 11 obtains the switch state of the key switch 3 described above based on the signal indicative of the switch state output from the key switch 3. In addition, the engine-status obtaining unit 11 may obtain an environment parameter (an atmospheric pressure, for example) for an environmental correction, as the engine status.

The engine-status obtaining unit 11 determines whether or not the reformed gas is in an unstable state with reference to the obtained switch state. The unstable state of the reformed gas refers to a state in which composition of the reformed gas flowing from the reformer 36 is not in a stable state because, for example, the reforming catalyst 36b is not sufficiently heated (activated), or the reforming air does not sufficiently flow in the reformer 36. On the contrary, the stable state of the reformed gas refers to a state in which the composition of the reformed gas flowing from the reformer 36 is in a predetermined stable state because the reforming catalyst 36b is sufficiently heated (activated), and the reforming air sufficiently flows in the reformer 36. The reforming catalyst 36b is sufficiently heated (activated) when, for example, a catalyst bed temperature is at approximately 200 degrees centigrade or higher.

The unstable state of the reformed gas is associated with a period, for example, from a point of time in which the switch state is set at the ST state to a point of time in which the composition of the reformed gas becomes stable. Specifically, the engine-status obtaining unit 11 determines that the reformed gas is in the unstable state when, for example, an elapsed time since the switch state is set at the ST state (an elapsed time since the start signal is input) is equal to or less than a predetermined composition stable time, i.e., the period in which the composition becomes stable. The composition stable time is predetermined based on the specification of the reformer 36 determined by, for example, performing a test or the like.

The engine-status obtaining unit 11 may determine that the reformed gas is in the unstable state when a time accumulation value of the flow rate of the reforming air since the switch state is set at the ST state is equal to or less than a predetermined reformed-gas replacement volume. The reformed-gas replacement volume is a volume value used for determining that a gas remaining inside the reformer 36 has been replaced with a new gas to a sufficient level before the engine 100 starts. The reformed-gas replacement volume may be a volume value of the gas that, for example, flows in the reforming flow passage 31 after the reforming-air throttle 32. The engine-status obtaining unit 11 may obtain the flow rate of the reforming air based on a signal detected by the reforming-air flow-rate sensor 4.

The period associated with the unstable state of the reformed gas includes at least a period immediately after the engine 100 starts. For example, the period associated with the unstable state of the reformed gas includes a period in which an ignition frequency after the engine has perfectly exploded is equal to or less than a predetermined ignition frequency. The predetermined ignition frequency may be an ignition frequency at which, for example, combustion becomes stable after the engine 100 has perfectly exploded. Time to reach the predetermined ignition frequency is shorter than the above-described composition stable time. The state in which the engine has perfectly exploded may refer to a state in which, for example, the engine speed becomes equal to or larger than a predetermined threshold of the perfect explosion.

The engine-status obtaining unit 11 may obtain a start state of the engine 100 when the switch state is set at the ST state. The engine-status obtaining unit 11 may obtain a normal operation state of the engine 100 when the switch state is set at the ON state and the reformed gas is in the stable state. The engine-status obtaining unit 11 may obtain an operation stop state of the engine 100 when the switch state is set at the OFF state. The operation stop state includes, for example, a state in which the engine freewheels immediately after the switch state is changed from the ON state to the OFF state before the engine speed is reduced to absolute zero.

The required energy computing unit 12 computes the required energy based on the engine status (for example, the engine speed and the amount of depressing the accelerator pedal). The required energy refers to energy corresponding to a load required to output from the engine main body 21. The required energy computing unit 12 computes the required energy based on, for example, a map data that has been prepared to show a relationship of the required energy with the engine speed and the amount of depressing the accelerator pedal obtained by a test, a simulation, or the like. The required energy may be indicated by various indexes such as power, an indicated mean effective pressure, and a brake mean effective pressure.

The fuel ratio computing unit 13 computes a fuel ratio based on the required energy. The fuel ratio refers to a ratio between the ammonia gas and the hydrogen gas in the air-fuel mixture that is supplied to the engine main body 21, which is an index used for controlling the main injector 24, the reforming-air throttle 32, and the reforming-fuel injector 35.

The fuel ratio computing unit 13 computes, for example, a normal fuel ratio based on the required energy when the composition of the reformed gas is in the stable state. The normal fuel ratio is a fuel ratio when the composition of the reformed gas is in the stable state. The normal fuel ratio may be a ratio among the first ammonia gas, the second ammonia gas, and the hydrogen gas when the composition of the reformed gas is in the stable state. The fuel ratio computing unit 13 computes the normal fuel ratio based on, for example, the required energy and a reforming map. In the reforming map, for example, data containing the composition of the reformed gas in the stable state has been prepared based on characteristics and the like of the reforming catalyst 36b.

The main throttle control unit 14 controls the main throttle 23 based on the engine status and the required energy. Specifically, in the start state of the engine, the main throttle control unit 14 controls the main throttle 23 to, for example, a predetermined start main degree, i.e., a predetermined degree of opening of the main throttle at a start of the engine. In the normal operation state of the engine, the main throttle control unit 14 may control the main throttle 23 to a degree of opening that allows the engine main body 21 to intake the air of the flow rate sufficient to produce the required energy, through the intake flow passage 22. In the operation stop state of the engine, the main throttle control unit 14 may control the main throttle 23 to a predetermined stop main degree, i.e., a predetermined degree of opening of the main throttle at a stop of the engine.

When the reformer 36 has been sufficiently heated in the start state of the engine, the main throttle control unit 14 controls the main throttle 23 to, for example, the predetermined start main degree.

The reformer control unit 15 controls the reforming assembly 30 based on the engine status, the required energy, and the fuel ratio. The reformer control unit 15 controls, for example, the reforming-air throttle 32 and the reforming-fuel injector 35 so that the ratio between the ammonia gas and the hydrogen gas in the air-fuel mixture supplied to the engine main body 21 becomes the normal fuel ratio in the normal operation state of the engine. This allows the reforming air and the ammonia gas to be supplied to the reformer 36 so that the fuel is reformable in the reformer 36. The above-described control state of the reforming-air throttle 32 and the reforming-fuel injector 35 is referred to as a reformable state. The reformer control unit 15 controls, for example, the stop valve 38 to a normal degree of opening in the normal operation state of the engine. The normal degree of opening refers to a degree of opening of the stop valve 38 when the composition of the reformed gas is in the stable state. The normal degree of opening is, as an example, the fully-opened degree of opening of the stop valve 38. The normal degree of opening may not necessarily be the fully-opened degree of opening as long as the air-fuel mixture of the normal fuel ratio is suppliable to the engine main body 21. Instead of providing the reforming-air throttle 32, the degree of opening of the stop valve 38 may be controlled so that the ratio between the ammonia gas and the hydrogen gas in the air-fuel mixture supplied to the engine main body 21 becomes the normal fuel ratio. In this case, the stop valve 38 serves as both the reforming-air adjuster and the reformed-gas adjuster. Instead of providing the stop valve 38, the flow rate of the reformed gas may be controlled by the reforming-air throttle 32. In this case, the reforming-air throttle 32 serves as both the reforming-air adjuster and the reformed-gas adjuster.

The reformer control unit 15 controls the reforming-air throttle 32 and the reforming-fuel injector 35 to the reformable state when the switch state is set at the ST state (the start signal is input). When the switch state is set at the ST state (the start signal is input), the reformer control unit 15 controls the reformer heater 36a so that the reformer heater 36a is activated to heat (activate) the reforming catalyst 36b.

The reformer control unit 15 controls the stop valve 38 to a degree of opening smaller than the normal degree of opening for a given period of time including at least the period immediately after the engine 100 starts. The reformer control unit 15 controls the stop valve 38 to a degree of opening smaller than the normal degree of opening for, for example, the above-described period associated with the unstable state of the reformed gas.

As an example, the reformer control unit 15 controls the stop valve 38 so that the degree of opening of the stop valve 38 gradually increases from an initial degree of opening smaller than the normal degree of opening to the normal degree of opening after the switch state is set at the ST state (the start signal is input). The given period of time may be a period in which the elapsed time since the switch state is set at the ST state is equal to or less than the composition stable time (a period in which a predetermined time elapses since the start signal is input).

Figure 3:
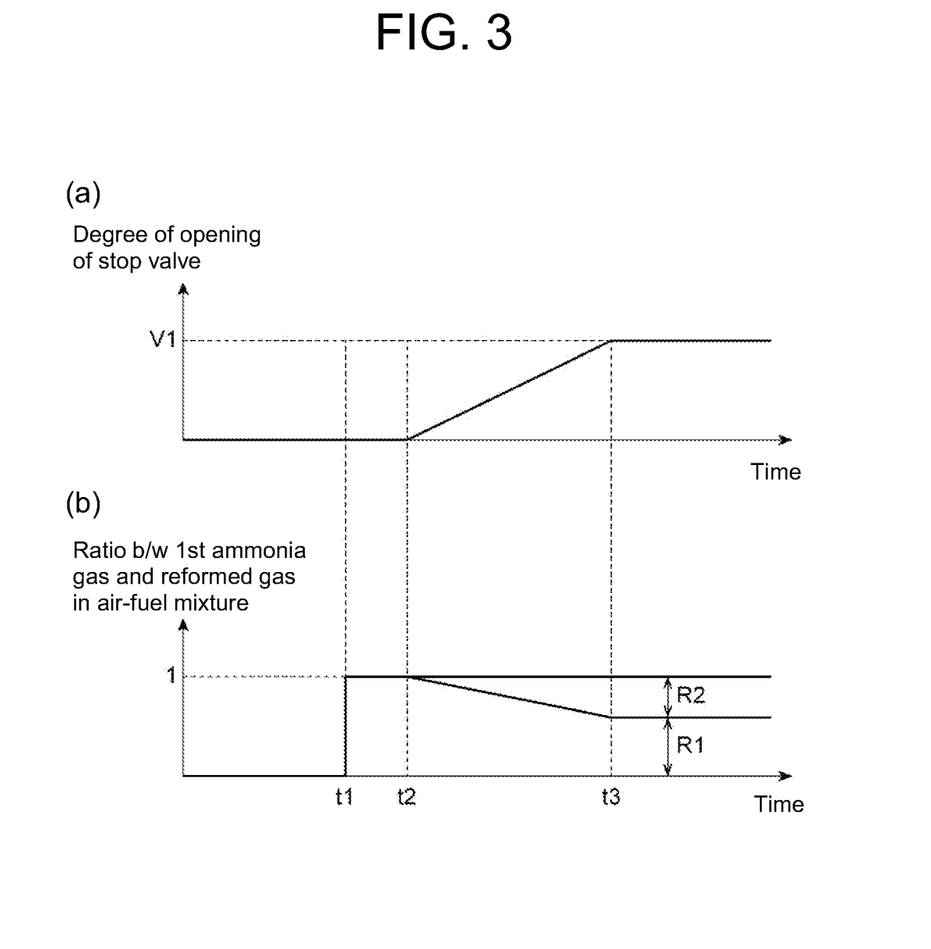
FIG. 3 is a timing diagram illustrating an operation example of the engine illustrated in FIG. 1.

Specifically, the degree of opening of the stop valve 38 varies as illustrated in FIG. 3 at (a). The ratio between the first ammonia gas and the reformed gas in the air-fuel mixture varies as illustrated in FIG. 3 at (b). In an example illustrated in FIG. 3 at (a) and (b), the switch state is set at the ST state at Time t1, the ignition frequency after the engine has perfectly exploded reaches the predetermined ignition frequency at Time t2, and the elapsed time since the switch state is set at the ST state is equal to the composition stable time at Time t3. In other words, a period from Time t1 to Time t3 corresponds to the period associated with the unstable state of the reformed gas, and a period after Time t3 corresponds to the period associated with the stable state of the reformed gas.

As illustrated in FIG. 3 at (a), the reformer control unit 15 controls the stop valve 38 so that the stop valve 38 maintains the fully-closed degree of opening as the initial degree of opening smaller than the normal degree of opening during a period (Time t1 to Time t2) from the point of time in which the switch state is set at the ST state to a point of time in which the ignition frequency after the engine has perfectly exploded becomes equal to or less than the predetermined ignition frequency. In other words, only the first ammonia gas is supplied to the engine main body 21 immediately after the engine 100 starts, and the reformed gas having the unstable composition is unlikely to be supplied to the engine main body 21 until the combustion becomes stable after the engine 100 has perfectly exploded. This reduces an adverse effect of the unstable composition of the reformed gas on the combustion immediately after the engine starts.

As illustrated in FIG. 3 at (a), the reformer control unit 15 controls the stop valve 38 so that the stop valve 38 gradually increases to a fully-opened degree of opening V1 as the normal degree of opening during a period (Time t2 to Time t3) from a point of time in which the ignition frequency after the engine has perfectly exploded exceeds the predetermined ignition frequency to a point of time in which the elapsed time since the switch state is set at the ST state becomes equal to the composition stable time. A gradient of the gradual increase in the degree of opening of the stop valve 38 in this case may be computed based on the fully-opened degree of opening V1 and the fully-closed degree of opening of the stop valve 38, and the composition stable time.

As a result, a ratio R1 of the first ammonia gas and a ratio R2 of the reformed gas in the air-fuel mixture vary as illustrated in FIG. 3 at (b). The ratio R1 of the first ammonia gas is 1 during the period (Time t1 to Time t2) from the point of time in which the switch state is set at the ST state to the point of time in which the ignition frequency after the engine has perfectly exploded becomes equal to or less than the predetermined ignition frequency. The ratio R1 of the first ammonia gas gradually decreases from 1 and the ratio R2 of the reformed gas gradually increases from 0 during the period (Time t2 to Time t3) from the point of time in which the ignition frequency after the engine has perfectly exploded exceeds the predetermined ignition frequency to the point of time in which the elapsed time since the switch state is set at the ST state becomes equal to the composition stable time. A ratio between the ratio R1 of the first ammonia gas and the ratio R2 of the reformed gas in the air-fuel mixture becomes equal to a ratio corresponding to the above-described normal fuel ratio when the elapsed time since the switch state is set at the ST state exceeds the composition stable time (after Time t3). As described above, gradually increasing the reformed gas reduces a possibility of a significantly change in the air-fuel ratio (A/F) of the air-fuel mixture containing the reformed gas.

Figure 4:
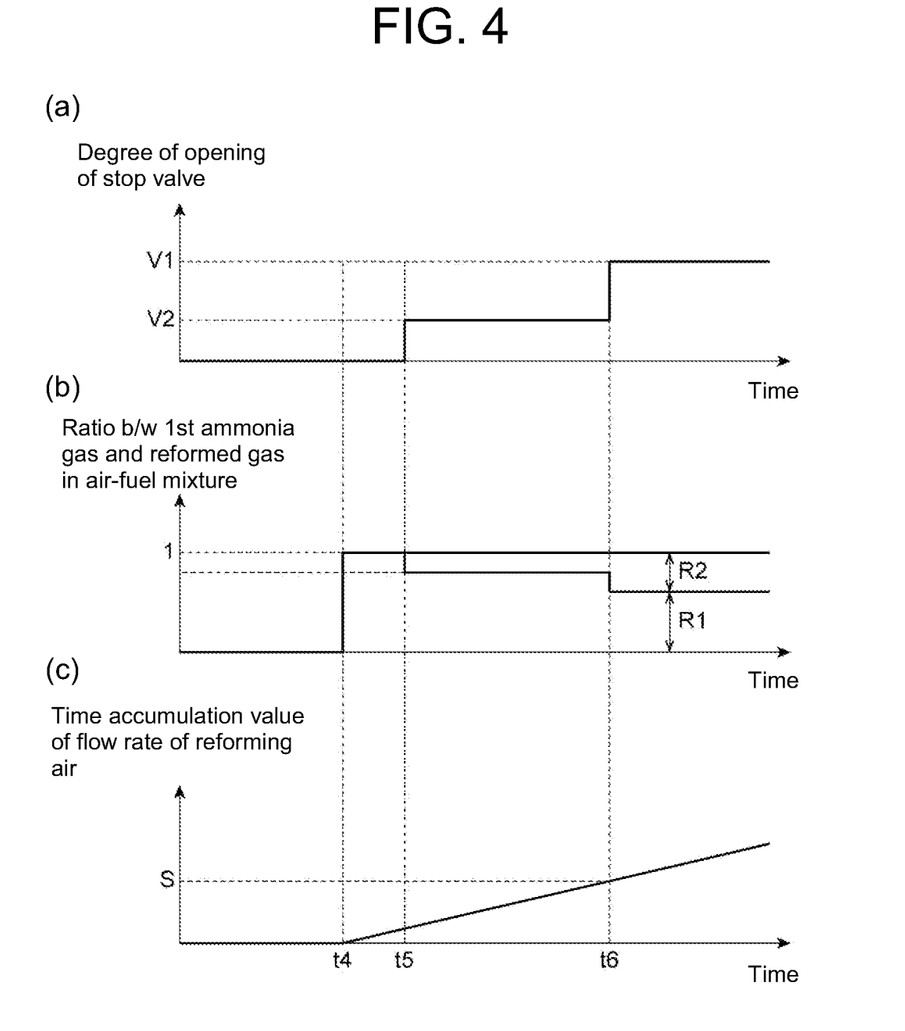
FIG. 4 is a timing diagram illustrating another operation example of the engine illustrated in FIG. 1.

As an alternative example, the reformer control unit 15 may control the stop valve 38 so that the degree of opening of the stop valve 38 maintains the initial degree of opening smaller than the normal degree of opening after the switch state is set at the ST state (the start signal is input). The given period of time may be a period from a point of time in which the start signal is input to the point of time in which the time accumulation value of the flow rate of the reforming air obtained by the reforming-air flow-rate sensor 4 reaches the reformed-gas replacement volume.

Specifically, the degree of opening of the stop valve 38 varies as illustrated in FIG. 4 at (a). The ratio between the first ammonia gas and the reformed gas in the air-fuel mixture varies as illustrated in FIG. 4 at (b). The time accumulation value of the flow rate of the reforming air varies as illustrated in FIG. 4 at (c). In an example illustrated in FIG. 4 at (a) to (c), the switch state is set at the ST state at Time t4, the ignition frequency after the engine has perfectly exploded reaches the predetermined ignition frequency at Time t5, and the time accumulation value of the flow rate of the reforming air reaches the reformed-gas replacement volume at Time t6. In other words, a period from Time t4 to Time t6 corresponds to the period associated with the unstable state of the reformed gas, and a period after Time t6 corresponds to the period associated with the stable state of the reformed gas.

As illustrated in FIG. 4 at (a) and (c), the reformer control unit 15 controls the stop valve 38 so that the stop valve 38 maintains the fully-closed degree of opening during a period (Time t4 to Time t5) from the point of time in which the switch state is set at the ST state to the point of time in which the ignition frequency after the engine has perfectly exploded becomes equal to or less than the predetermined ignition frequency. The reformer control unit 15 controls the stop valve 38 so that the stop valve 38 maintains an initial degree of opening V2 smaller than the normal degree of opening during a period (Time t5 to Time t6) from the point of time in which the ignition frequency after the engine has perfectly exploded exceeds the predetermined ignition frequency to a point of time in which the time accumulation value of the flow rate of the reforming air reaches a reformed-gas replacement volume S. The initial degree of opening V2 is a degree of opening smaller than the normal degree of opening and greater than the fully-closed degree of opening. The reformer control unit 15 controls the stop valve 38 so that the stop valve 38 has the fully-opened degree of opening V1 as the normal degree of opening after the time accumulation value of the flow rate of the reforming air exceeds the reformed-gas replacement volume S (after Time t6).

As a result, the ratio R1 of the first ammonia gas and the ratio R2 of the reformed gas in the air-fuel mixture vary as illustrated in FIG. 4 at (b). The ratio R1 of the first ammonia gas is 1 during the period (Time t4 to Time t5) from the point of time in which the switch state is set at the ST state to the point of time in which the ignition frequency after the engine has perfectly exploded becomes equal to or less than the predetermined ignition frequency. As to the ratio between the ratio R1 of the first ammonia gas and the ratio R2 of the reformed gas in the air-fuel mixture, the ratio R1 of the first ammonia gas is greater than the ratio corresponding to the above-described normal fuel ratio during the period (Time t5 to Time t6) from the point of time in which the ignition frequency after the engine has perfectly exploded exceeds the predetermined ignition frequency to the point of time in which the time accumulation value of the flow rate of the reforming air reaches the reformed-gas replacement volume S. The ratio between the ratio R1 of the first ammonia gas and the ratio R2 of the reformed gas in the air-fuel mixture becomes equal to the ratio corresponding to the above-described normal fuel ratio after the time accumulation value of the flow rate of the reforming air exceeds the reformed-gas replacement volume S (from Time t6).

For the sake of simplification, the reforming catalyst 36b is presumed to be activated at Time t1 in FIG. 3 and at Time t4 in FIG. 4.

The main-injector control unit 16 controls the main injector 24 based on the required energy and the fuel ratio (for example, the normal fuel ratio). When, for example, the reformed gas from the reformer 36 is not sufficient by itself to produce the required energy, the main-injector control unit 16 controls the main injector 24 so that the main injector 24 injects the first ammonia gas. When, for example, the reformed gas from the reformer 36 is sufficient by itself to produce the required energy, the main-injector control unit 16 does not need to control the main injector 24 for injection of the ammonia gas.

The ignition control unit 17 computes an ignition timing based on the engine speed and the required energy. The ignition control unit 17 may compute the ignition timing based on, for example, a map data that has been prepared to show a relationship of the ignition timing with the engine speed and the required energy obtained by a test, a simulation, or the like.

Figure 5:
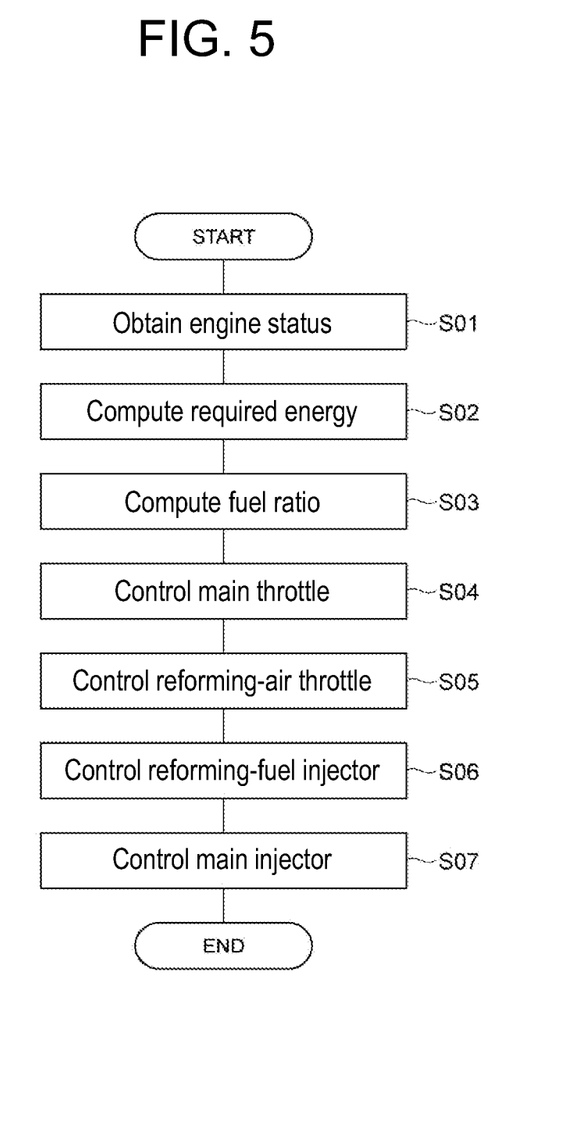
FIG. 5 is a flow chart illustrating normal-operation processing of an ECU illustrated in FIG. 2.
Figure 6:
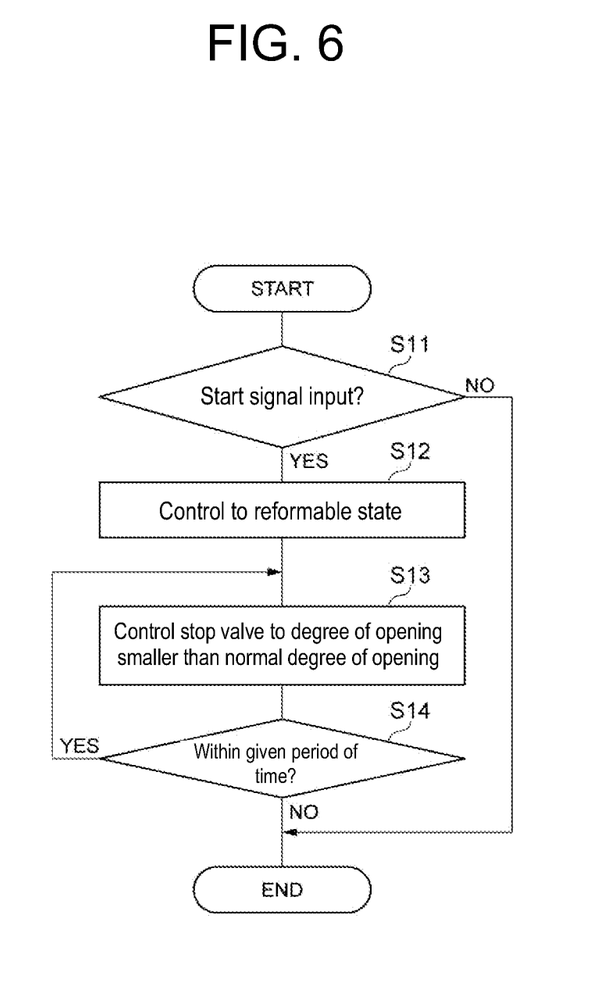
FIG. 6 is a flow chart illustrating reformed-gas reduction processing of the ECU illustrated in FIG. 2.

The following will describe an example of processing by the ECU 10 with reference to FIGS. 5 and 6. FIG. 5 is a flow chart illustrating normal-operation processing of the ECU 10.

As illustrated in FIG. 5, the ECU 10 controls the engine-status obtaining unit 11 so that the engine-status obtaining unit 11 obtains the engine status in S01. The engine-status obtaining unit 11 obtains, as the engine status, the engine speed detected by the engine speed sensor 1 and the amount of depressing the accelerator pedal detected by the accelerator sensor 2. The engine-status obtaining unit 11 obtains the state of the reformed gas, either stable or unstable, with reference to the obtained switch state. The engine-status obtaining unit 11 obtains the state of the engine 100, either in the start state, the normal operation state, or the operation stop state, with reference to the obtained switch state.

The ECU 10 controls the required energy computing unit 12 so that the required energy computing unit 12 computes the required energy in S02. The required energy computing unit 12 computes the required energy based on, for example, a map data that has been prepared to show a relationship of the required energy with the engine speed and the amount of depressing the accelerator pedal obtained by a test, a simulation, or the like.

The ECU 10 controls the fuel ratio computing unit 13 so that the fuel ratio computing unit 13 computes the fuel ratio in S03. The fuel ratio computing unit 13 computes the normal fuel ratio in the state where the composition of the reformed gas is in the stable state.

The ECU 10 controls the main throttle control unit 14 so that the main throttle control unit 14 controls the main throttle 23 in S04. In the start state of the engine, the main throttle control unit 14 controls the main throttle 23 to the predetermined start main degree. In the normal operation state of the engine, the main throttle control unit 14 controls the main throttle 23 to the degree of opening that allows the engine main body 21 to intake the air of the flow rate sufficient to produce the required energy, through the intake flow passage 22.

The ECU 10 controls the reformer control unit 15 so that the reformer control unit 15 controls the reforming-air throttle 32 in S05. The ECU 10 controls the reformer control unit 15 so that the reformer control unit 15 also controls the reforming-fuel injector 35 in S06. The reformer control unit 15 controls the reforming-air throttle 32 and the reforming-fuel injector 35 to the reformable state.

The ECU 10 controls the main-injector control unit 16 so that the main-injector control unit 16 controls the main injector 24 in S07. The main-injector control unit 16 controls the main injector 24 based on the required energy and the normal fuel ratio. Then, the ECU 10 ends the processing illustrated in FIG. 5.

FIG. 6 is a flow chart illustrating reformed-gas reduction processing of the ECU 10. The ECU 10 controls the engine-status obtaining unit 11 so that the engine-status obtaining unit 11 determines whether or not the start signal is input in S11. When the engine-status obtaining unit 11 determines that the start signal is not input (S11: NO), the ECU 10 ends the processing illustrated in FIG. 6.

When the engine-status obtaining unit 11 determines that the start signal is input (S11: YES), the ECU 10 controls the reforming assembly 30 so that the fuel is reformable in the reformer 36 in S12. In particular, the reformer control unit 15 controls the reforming-air throttle 32 and the reforming-fuel injector 35 to the reformable state.

The ECU 10 controls the reformer control unit 15 so that the reformer control unit 15 controls the stop valve 38 to a degree of opening smaller than the normal degree of opening in S13. The reformer control unit 15 controls the stop valve 38 so that, for example, the degree of opening of the stop valve 38 gradually increases from the initial degree of opening smaller than the normal degree of opening to the normal degree of opening after the switch state is set at the ST state (the start signal is input). Alternatively, the reformer control unit 15 may control the stop valve 38 so that the degree of opening of the stop valve 38 maintains the initial degree of opening smaller than the normal degree of opening after the switch state is set at the ST state (the start signal is input).

The ECU 10 controls the engine-status obtaining unit 11 so that the engine-status obtaining unit 11 determines whether or not controlling the stop valve 38 is within the given period of time in S14. The engine-status obtaining unit 11 determines that the reformed gas is in the unstable state when, for example, the elapsed time since the switch state is set at the ST state (the elapsed time since the start signal is input) is equal to or less than the predetermined composition stable time. Alternatively, the engine-status obtaining unit 11 may determine that the reformed gas is in the unstable state when the time accumulation value of the flow rate of the reforming air since the switch state is set at the ST state is equal to or less than the predetermined reformed-gas replacement volume. Alternatively, the engine-status obtaining unit 11 may determine whether or not the reformed gas is in the unstable state by measuring a temperature of the reformer heater 36a or a temperature at an exit of the reformer 36.

When the engine-status obtaining unit 11 determines that controlling the stop valve 38 is within the given period of time (S14: YES), the ECU 10 repeats the processing in S13. On the other hand, when the engine-status obtaining unit 11 determines that controlling the stop valve 38 is without the given period of time (S14: NO), the ECU 10 ends the processing illustrated in FIG. 6.

Operation and Advantageous Effect

In the engine 100 according to the embodiment of the present invention as described above, when the start signal is input, the stop valve 38 is controlled to the reformable state in which the fuel is reformable in the reformer 36, and is controlled to a degree of opening smaller than the normal degree of opening for the given period of time including at least the period immediately after the engine 100 starts. This reduces the flow rate of the reformed gas introduced into the intake flow passage 22 of the engine main body 21 to less than the flow rate corresponding to the normal degree of opening, at least immediately after the engine 100 starts. Therefore, for example, even when the composition of the reformed gas is not in the stable state immediately after the engine 100 starts, the adverse effect of the unstable composition of the reformed gas on performance of the engine 100 is reduced. As a result, the engine 100 is capable of reducing deterioration in performance caused by the composition of the reformed gas that is introduced into the intake flow passage 22 immediately after the engine 100 starts. As some examples of the deterioration in the performance of the engine caused by the composition of the reformed gas, incompletely combusted gas may flow through the engine when the air-fuel mixture becomes excessively rich or an accidental fire may be caused in the engine when the air-fuel mixture becomes excessively lean. The engine according to the present invention appropriately reduces such deterioration in the performance.

In the engine 100, the ECU 10 controls the stop valve 38 so that the degree of opening of the stop valve 38 gradually increases from the initial degree of opening smaller than the normal degree of opening to the normal degree of opening after the start signal is input. This gradually increases the flow rate of the reformed gas introduced into the intake flow passage 22 of the engine main body 21, which gradually changes the air-fuel ratio of the air-fuel mixture in the combustion chamber of the engine main body 21.

In the engine 100, the given period of time is the period in which the composition stable time (predetermined time) elapses since the start signal is input. In this case, the stop valve 38 is controlled based on an inference that the composition of the reformed gas would be stable according to the elapsed time since the start signal is input.

In the engine 100, the reforming-airflow-rate sensor 4 configured to obtain the flow rate of the reforming air is provided to the reforming flow passage 31. The given period of time is the period from the point of time in which the start signal is input to the point of time in which the time accumulation value of the flow rate of the reforming air obtained by the reforming-air flow-rate sensor 4 reaches the reformed-gas replacement volume. In this case, the stop valve 38 is controlled based on an inference that the composition of the reformed gas would be stable according to the time accumulation value of the flow rate of the reforming air since the start signal is input.

In the engine 100, as an example, the initial degree of opening is the fully-closed degree of opening of the stop valve 38, and the normal degree of opening is the fully-opened degree of opening of the stop valve 38. By controlling the degree of opening of the stop valve 38, the adverse effect of the composition of the reformed gas introduced into the intake flow passage 22 on the performance of the engine 100 is more securely reduced.

The engine 100 is an ammonia engine including the reformer 36 that is configured to reform the ammonia as the fuel into the reformed gas containing the hydrogen gas. In the above engine, the deterioration in the performance caused by the unstable composition of the reformed gas is more likely to occur than in an engine including the reformer that is configured to reform fuel containing, for example, hydrocarbons into the reformed gas. Therefore, an effect of reduction in the deterioration in the performance of an engine is enhanced in the above-described configuration of the present embodiment.

Modifications

The embodiment according to the present invention has been described above, but the scope of the present invention is not limited to the embodiment described above.

In the embodiment described above, the air-flow rate obtaining unit is exemplified by the reforming-air flow-rate sensor 4. However, the air-flow rate obtaining unit is not limited to the above configuration. For example, a sensor configured to detect pressures before and after the reforming-air throttle 32 may be used to obtain the flow rate of the reforming air flowing through the reforming-air throttle 32, instead.

In the embodiment described above, the reforming-air adjuster is exemplified by the reforming-air throttle 32. Instead of a throttle, for example, a solenoid valve or the like may be used.

In the above-described embodiment, the number of the reforming-fuel injectors 35 is single as an example. However, the number of the reforming-fuel injectors 35 may be multiple, instead.

In the embodiment described above, the reformed-gas adjuster is exemplified by the stop valve 38. However, instead of the solenoid valve, for example, a butterfly valve, or a three-way valve or the like disposed in the intake flow passage 22 may be used.

In the embodiment described above, the three-way catalyst 26 is provided. However, the three-way catalyst 26 may be omitted.

In the embodiment described above, the composition stable time is used as a factor for determining whether or not controlling the stop valve 38 is within the given period of time, as an example. However, another factor may be used for determining whether or not controlling the stop valve 38 is within the given period as long as the reforming catalyst 36b is sufficiently heated (activated) and the reforming air sufficiently flows in the reformer 36 by the given period.

In the embodiment described above, the reformed-gas replacement volume, i.e., the volume of the gas flowing in the reforming flow passage 31 after the reforming-air throttle 32, is used as a factor for determining whether or not controlling the stop valve 38 is within the given period of time, as an example. However, other volume value may be used for determining whether or not controlling the stop valve 38 is within the given period as long as the value is equal to or greater than the volume of the reformer 36.

In the embodiment described above, either the composition stable time or the reformed-gas replacement volume is used as factors for determining whether or not controlling the stop valve 38 is within the given period of time as examples. However, these factors may be combined together, or either or both of them may be combined with another factor.

In the embodiment described above, the reformer control unit 15 controls the stop valve 38 so that the degree of opening of the stop valve 38 gradually and linearly increases from a degree of opening smaller than the normal degree of opening to the normal degree of opening, as an example. However, the degree of opening of the stop valve 38 may be increased non-linearly or stepwisely.

In the embodiment described above, the reformer control unit 15 controls the stop valve 38 so that the stop valve 38 maintains the degree of opening during the period in which the ignition frequency after the engine has perfectly exploded is equal to or less than the predetermined ignition frequency. However, the stop valve 38 does not necessarily maintain the degree of opening.

In the embodiment described above, the normal degree of opening is the fully-opened degree of opening of the stop valve 38. However, the normal degree of opening may be smaller than the fully-opened degree of opening as long as the fuel is in the reformable state.

In the embodiment described above, the engine 100 is the ammonia engine. However, the engine may include a reformer that is configured to reform, for example, hydrocarbon-based fuel.

REFERENCE SIGNS LIST 3 key switch (start-signal output unit)
4 reforming-air flow-rate sensor (air-flow rate obtaining unit)
10 ECU (control unit)
22 intake flow passage
24 main injector (main fuel-supply unit)
31 reforming flow passage
32 reforming-air throttle (reforming-air adjuster)
35 reforming-fuel injector (reforming-fuel supply unit)
36 reformer
38 stop valve (reformed-gas adjuster)
100 engine

The invention claimed is:

1. An engine including a reformer that is configured to reform fuel into a reformed gas, comprising:
an intake flow passage configured to flow intake air to the engine;
a reforming flow passage provided with the reformer and configured to flow reforming air to the reformer and to flow the reformed gas from the reformer to the intake flow passage;
a main fuel injector disposed in the intake flow passage and configured to supply the fuel to the intake flow passage;
a reforming-air valve disposed in the reforming flow passage and configured to adjust a flow rate of the reforming air;
a reforming fuel injector disposed in the reforming flow passage and upstream from the reformer and configured to supply the fuel to the reforming flow passage;
a reformed-gas valve disposed in the reforming flow passage and configured to be opened to supply the reforming air to the reformer and to adjust a flow rate of the reformed gas;
a starter configured to output a start signal to start the engine; and
a controller configured to control the main fuel injector, the reforming-air valve, the reforming fuel injector, and the reformed-gas valve, based on the start signal and an engine status of the engine, wherein
when the start signal is input,
the controller is configured to control the reforming-air valve and the reforming fuel injector to a reformable state in which the fuel is reformable in the reformer, and
the controller is configured to control the reformed-gas valve so that the reformed gas flows through the reformed-gas valve with a degree of opening smaller than a normal degree of opening that is a degree of opening of the reformed-gas valve when composition of the reformed gas is in a stable state before the composition of the reformed gas becomes in the stable state, for a given period of time including at least a period immediately after the engine starts.

2. The engine according to claim 1, wherein
the controller is configured to control the reformed-gas valve so that the degree of opening of the reformed-gas valve gradually increases from an initial degree of opening smaller than the normal degree of opening to the normal degree of opening after the start signal is input.

3. The engine according to claim 2, wherein
the initial degree of opening is a fully-closed degree of opening of the reformed-gas valve, and
the normal degree of opening is a fully-opened degree of opening of the reformed-gas valve.

4. The engine according to claim 1, wherein
the given period of time includes a period in which a predetermined time elapses since the start signal is input.

5. The engine according to claim 1, wherein
the engine is an ammonia engine including the reformer that is configured to reform ammonia as the fuel into the reformed gas containing a hydrogen gas.

6. An engine including a reformer that is configured to reform fuel into a reformed gas, comprising:
an intake flow passage configured to flow intake air to the engine;
a reforming flow passage provided with the reformer and configured to flow reforming air to the reformer and to flow the reformed gas from the reformer to the intake flow passage;
a main fuel injector disposed in the intake flow passage and configured to supply the fuel to the intake flow passage;
a reforming-air valve disposed in the reforming flow passage and configured to adjust a flow rate of the reforming air;
a reforming fuel injector disposed in the reforming flow passage and upstream from the reformer and configured to supply the fuel to the reforming flow passage;
a reformed-gas valve disposed in the reforming flow passage and configured to adjust a flow rate of the reformed gas;
a starter configured to output a start signal to start the engine; and
a controller configured to control the main fuel injector, the reforming-air valve, the reforming fuel injector, and the reformed-gas valve, based on the start signal and an engine status of the engine, wherein
when the start signal is input,
the controller is configured to control the reforming-air valve and the reforming fuel injector to a reformable state in which the fuel is reformable in the reformer, and
the controller is configured to control the reformed-gas valve so that the reformed gas flows through the reformed-gas valve with a degree of opening smaller than a normal degree of opening that is a degree of opening of the reformed-gas valve when composition of the reformed gas is in a stable state before the composition of the reformed gas becomes in the stable state, for a given period of time including at least a period immediately after the engine starts, wherein the engine further comprises:

an air-flow rate sensor disposed in the reforming flow passage and configured to obtain the flow rate of the reforming air, wherein the given period of time includes a period from a point of time in which the start signal is input to a point of time in which a time accumulation value of the flow rate of the reforming air obtained by the air-flow rate sensor reaches a predetermined reformed-gas replacement volume.

* * * * *